United States Patent [19]

Campen et al.

[11] 3,758,594

[45] Sept. 11, 1973

[54] PROCESS FOR PRODUCING SULPHONIUM COMPOUNDS

[75] Inventors: Jan P. Campen; Ernest L. T. M. Spitzer; Wilhelmus A. A. Senden; Jeffrey S. Hill, all of Amsterdam, Netherlands

[73] Assignee: Shell Oil Company, New York, N.Y.

[22] Filed: Aug. 18, 1971

[21] Appl. No.: 172,908

[30] Foreign Application Priority Data
Aug. 26, 1970 Great Britain.................. 41,067/70

[52] U.S. Cl........................... 260/607 B, 260/607 B
[51] Int. Cl.......................................... C07c 149/46
[58] Field of Search ................................ 260/607 B

[56] References Cited
UNITED STATES PATENTS
2,252,081   8/1941   Lieber............................. 260/607 B Primary Examiner—Lewis Gotts
Assistant Examiner—D. R. Phillips
Attorney—Howard W. Haworth et al.

[57] ABSTRACT

Dialkyl-methyl sulfonium chlorides, having at least one alkyl group of at least four carbon atoms are produced by the reaction of a higher dialkyl sulfide with methyl chloride at 60°–100°C in the presence of specified quantities of hydrofluoric or hydrochloric acid.

6 Claims, No Drawings

PROCESS FOR PRODUCING SULPHONIUM COMPOUNDS

BACKGROUND OF THE INVENTION AND PRIOR ART

This invention relates to the preparation of higher dialkyl-methyl sulfonium chlorides. As used herein, higher dialkyl-methyl sulfonium chloride refers to a sulfonium chloride having at least one alkyl group containing a chain of at least four carbon atoms.

Spitzer et al., U.S. Pat. No. 3,432,257 (issued Mar. 11, 1969) disclose the use of higher dialkyl sulfonium chlorides as extracting agents in the winning of metal values from aqueous solutions. The method taught by Spitzer et al for preparing dialkyl sulfonium chlorides contemplates two steps:

1. methylation of a dialkyl sulfide with dimethyl sulfate, and
2. conversion of the resulting sulfonium methyl sulfate to the corresponding chloride by an exchange reaction with hydrochloric acid.

This two-step procedure is in accordance with prior art methods, for example, Houben-Weyl, Methoden der Organischen Chemie, Volume 9, pages 175-194. This two-step reaction sequence suffers from a number of practical disadvantages. First, dimethyl sulfate is a toxic and expensive reactant. Secondly, the dimethyl sulfate participates in the reaction with only one of its two methyl groups. Finally, the exchange reaction with hydrochloric acid proceeds slowly and requires many successive steps for completion. It would be desirable if the above-indicated reaction steps could be combined into a single step, and employ an alkyl chloride as an alkylating agent.

Lieber, U.S. Pat. No. 2,252,081 (issued Aug. 12, 1941) teaches that sulfonium chlorides may be prepared at or slightly below room temperature by the reaction of an organic sulfide with an alkyl chloride in an inert, anhydrous alcohol. Britton et al., U.S. Pat. No. 2,366,176 and U.S. Pat. No. 2,402,016 (issued Jan. 2, 1945 and June 11, 1946, respectively) broadly suggest a "spontaneous addition reaction" for preparing sulfonium halides from alkyl halides and dialkyl sulfides containing as many as eighteen carbon atoms in the alkyl moieties. Funazukuri, Japanese Patent Application 1961-2,173 (filed Oct. 11, 1957; Chemical Abstracts, 56 : 8566cc (1962)) teaches the preparation of trimethyl- and triethyl- sulfonium halides by the reaction of dimethyl- and diethyl-sulfides with in situ — generated, corresponding alkyl halides.

As shown in the comparative examples which follow below, the foregoing one-step procedures for preparing low molecular weight sulfonium chlorides may not be extended to methyl-homologs of higher molecular weight.

BRIEF DESCRIPTION OF THE INVENTION

It has now been found that dialkyl-methyl sulfonium chlorides having at least one alkyl group of at least four carbon atoms may be prepared in excellent yield by the reaction of a higher dialkyl sulfide with methyl chloride at about 60° to about 100°C in the presence of at least 1.5 molecular equivalents of a hydrohalic acid catalyst per mole of dialkyl sulfide, wherein the hydrohalic acid catalyst is selected from the group consisting of hydrochloric and hydrofluoric acids.

DETAILED DESCRIPTION OF THE INVENTION

A. The Dialkyl Sulfide Reactant.

The higher dialkyl sulfide reactant possesses at least one alkyl moiety containing a chain of at least four carbon atoms. Although the total number of carbon atoms in the dialkyl sulfide may vary between rather wide limits, the preferred dialkyl sulfides have an "effective chain length" of at least nine atoms. Particularly preferred dialkyl sulfide substrates are those having effective chain lengths of between about 15 and about 25 atoms. By "effective chain length" is meant the number of atoms, other than hydrogen, which collectively form the longest chain present in the molecule. Such a chain may contain not only atoms of carbon but, in addition, a sulfur atom. Thus, the effective chain length of, for example, a didodecyl sulfide amounts to 25 atoms, since the longest chain consists of $(2 \times 12) = 24$ carbon atoms plus one sulfur atom. Examples of suitable dialkyl sulfides are methylheptyl sulfide, diisoamyl sulfide, dicetyl sulfide, and the like. Preferred sulfide substrates are those having from about eight to about 12 carbon atoms, inclusive, per alkyl moiety. Additionally preferred are those alkyl groups present in the dialkyl sulfide which are secondary alkyl in structure.

B. The Acid Catalysts.

The catalytic activity of hydrofluoric and hydrochloric acids is surprising in view of the known tendency of acids to induce disproportionation ractions in higher sulfides (see Houben-Weyle, supra, at page 183). Such disproportionation activity would be expected, in the process of the present invention, to result in a reduced yield of the desired sulfonium compound. The use of hydrofluoric and hydrochloric acids as catalysts in the preparation of higher dialkyl-methyl sulfonium chlorides offers at least two major benefits. First, with proper precautions, the acid catalysts are safe and economical to work with. Secondly, because of their volatility, hydrofluoric and hydrochloric acids are easily removed from the reaction product, thus minimizing purification problems. The terms "hydrofluoric acid" and "hydrochloric acid" are used to broadly indicate the respective hydrogen halides, independent of the presence or absence of water.

C. Reaction Conditions

The reaction may be carried out with or without the addition of a solvent. When a solvent is employed, inert materials such as methanol, diisopropyl ether, dichloroethane or toluene are preferred. Generally, however, it is preferable to effect the alkylation in the absence of a solvent. In view of the volatile nature of reactants and acid catalysts which participate in the reaction, it is generally advantageous to maintain them substantially in a liquid state. Pressures in the range of about 5 to about 100 atmospheres gauge will generally suffice, depending in part upon the type and amount of substrates and acid catalysts which are present. Desirably, a high ratio of liquid to gas is maintained within the reaction vessel, preferably at least 1:1, so that the reactor contains a maximum proportion of liquid. The reaction is typically conducted at a temperature between about 60° and about 100°C; preferably, the temperature is maintained between about 70° and about 90°C. The time of reaction is not critical in the formation of the desired dialkyl sulfonium chlorides, and may vary, for instance, between about 2 and about 12 hours.

Water is preferably excluded from the reaction mixture, although the addition of small amounts, i.e., up to about 5 percent by weight based on the total reactants, is not detrimental. The ratio of reactants, one to another, and to the hydrohalic acid catalyst, is variable. reacted methyl chloride and hydrohalic acid catalyst, were allowed to escape. After further cooling to room temperature, the two-phase product was separated into a sulfonium chloride and a residual disulfide layer. Further experimental details appear in Table I.

TABLE 1.—PREPARATION OF METHYL DI-SEC. OCTYL SULFONIUM CHLORIDE

| Run: | Catalyst | Molar ratio, sulfide: $CH_3Cl$ hydrohalic acid catalyst | Temp., °C. | Pressure, atg. | Reaction time, hours | Yield of sulfonium chloride, percent based on disulfide charged |
|---|---|---|---|---|---|---|
| 1 | Hydrohalic acid | 1:1.2:4 | 80 | 6 | 2 | 50 |
| 2 | do | 1:1.2:4 | 80 | 7 | 4 | 61 |
| 3 | do | 1:2:4 | 80 | 12→10 | 4 | 75 |
| 4 | do | 1:3:4 | 80 | 12→10 | 4 | 82 |
| 5 | do | 1:4:4 | 80 | 14→10 | 4 | 88 |
| 6 | do | 1:2:4 | 70 | 8 | 4 | 58 |
| 7 | do | 1:2:4 | 90 | 13→9 | 4 | 82 |
| 8 | do | 1:2:1 | 80 | 12→11 | 4 | 23 |
| 9 [1] | do | 1:2:4 | 90 | 17→13 | 6 | 90 |
| 10 | HCl | 1:4:4 | 80 | 40→26 | 4 | 68 |
| 11 | HCl | 1:4:4 | 80 | 46→28 | 8 | 90 |
| 12 | HCl | 1:4:10 | 80 | 57→50 | 4 | 90 |
| 13 | HCl | 1:1.2:4 | 80 | 51→25 | 8 | 72 |
| 14 | HCl | 1:1.2:1 | 80 | 20→15 | 8 | 16 |
| 15 | HCl | 1:2:4 | 80 | 28→21 | 4 | 39 |

[1] Instead of di-octy sulfide, di-sec decylsulfide was used.

The molar ratio of methyl chloride to dialkyl sulfide in the reacting mixture is at least 1:1, and preferably is within the range of from about 1.5:1 to about 6:1. The formation of sulfonium chlorides proceeds in a particularly effcient manner when the molar ratio of methyl chloride to dialkyl sulfide is in the range of from about 3:1 to about 5:1. At least 1.5 molecular equivalents of the hydrohalic acid catalyst are present per mole of dialkyl sulfide in the reacting mixture, and preferably at least three but no more than about 15 molecular equivalents are so employed.

The sulfonium chloride product may be recovered by known techniques, for example, by flashing off volatile components (hydrofluoric acid, hydrochloric acid, methyl chloride, and the like), water washing, distillation, and by similar procedures. Where hydrofluoric acid has been employed as the acid catalyst, some fluoride may remain in the sulfonium chloride; this may be removed by a wash with concentrated calcium chloride, which precipitates calcium fluoride.

An advantageous method of recovering volatile methyl chloride and/or hydrohalic acid catalyst is to condense the pressurized gases in a pressure vessel cooled to a temperature of about $-100°$ to about 30°C. By such a technique, the size of compression equipment required for the highly corrosive recycle streams may be minimized.

ILLUSTRATIVE EMBODIMENTS

I. Preparation of Di-sec.Octylmethyl Sulfonium Chloride

Di-sec.octyl sulfide was reacted in an autoclave with methyl chloride in the presence of hydrochloric or hydrofluoric acid catalysts. The sulfide was weighed into a polypropylene beaker containing a magnetic stirring bar. The beaker was placed into an autoclave which was subsequently cooled to $-30°C$. Cold methyl chloride and hydrohalic acid catalyst were then added, and the autoclave was sealed and heated to reaction temperature. After completion of the reaction the autoclave was cooled to 50°C and the gases, comprising unreacted methyl chloride and hydrohalic acid catalyst, were allowed to escape. After further cooling to room temperature, the two-phase product was separated into a sulfonium chloride and a residual disulfide layer. Further experimental details appear in Table I.

II. Preparation of Di-Sec.Decylmethyl Sulfonium Chloride.

A crude sulfide mixture (168 g) containing 67.1%w of di-sec.decyl sulfide was added to a 500 ml Hastelloy C stirred autoclave. The autoclave was cooled to $-30°C$, whereupon 81 g of methyl chloride and 130 g of HCl were added. After sealing, the autoclave temperature was brought to 80°C, corresponding to a pressure of 70 atm. After 4 hours of reaction at 80°C, the autoclave was connected to a similar autoclave, evacuated, and maintained at a temperature of $-53°C$ to remove gaseous components of the reaction mixture. By this technique, 91 percent of the unreacted methyl chloride and 77 percent of the HCl condensed in the cold autoclave after pressure equilibrium had been achieved. These materials were employed in a subsequent batch. After cooling to room temperature, the reactor autoclave was brought to atmospheric pressure. The crude reaction product contained di-sec.decylmethylsulfonium chloride (88 percent yeild) and 2.6 mole HCl/mole of reaction product. The crude product was extracted five times with 25 ml of pentane to remove unconverted organic material (sulfide, polysulfide, mercaptan and sec-decylchloride), and subsequently stripped for 30 minutes at 20°C and 15 mm Hg. The extracted and stripped sulfonium chloride, containing 1.5 mole HCl/mole sulfonium chloride to enhance its stability, was obtained in a yield of 86 percent, basis dialkylsulfide charge.

COMPARATIVE EXAMPLE

In a series of runs, attempts were made to extend the teachings of Lieber, U.S. Pat. No. 2,252,081, and Funazukuri, Japanese Patent Application 1961-2,173 (Chemical Abstracts, 52: 8566cc (1962)), to the preparation of higher dialkyl-methyl sulfonium chlorides. These runs also were directed to evaluating the "spontaneous addition reaction" of a dialkyl sulfide with an alkyl halide, wherein the alkyl moieties contain from one to 18 carbon atoms, as taught by Britton et al, U.S. Pat. No. 2,366,176 and U.S. Pat. No. 2,402,016. As shown in Table 2, none of (1) an increase in reaction temperature, (2) an increase in the molar ratio of methyl chloride to dialkyl sulfide, or (3) the use of different solvents was beneficial to the selective formation of higher sulfonium chlorides.

TABLE 2.—ATTEMPTED EXTRAPOLATION OF U.S. 2,252,081 AND JAPANESE PATENT APPLICATION 1961—2,173 TO HIGHER DIALKYL SULFIDES

| Dialkyl sulfide | Molar Ratio, CH₃Cl: Dialkyl sulfide | Solvent[1] | Temperature, °C. | Pressure, atm. | Reaction time, hrs. | Dialkyl sulfonium chloride yield, percent m. on dialkyl sulfide charge |
|---|---|---|---|---|---|---|
| Run: | | | | | | |
| A.... Dimethyl sulfide | 1.2 | Methanol | 80 | 9–14 | 2 | 40 |
| B.... Di-n-propyl sulfide | 1.2 | ....do | 80 | 9–14 | 2 | 15 |
| C........do | 1.2 | ....do | 120 | 9–14 | 2 | 9 |
| D........do | 5 | ....do | 80 | 9–14 | 2 | 12 |
| E.... Diisopropyl sulfide | 1.2 | ....do | 80 | 9–14 | 2 | 4 |
| F[2]......do | 1.2 | ....do | 80 | 9–14 | 2 | 2 |
| G........do | 1.2 | Diisopropyl ether | 80 | 9–14 | 2 | 2 |
| H........do | 1.2 | 1,2-dichloroethane | 80 | 9–14 | 2 | 1 |
| I.... Di-sec.-octyl sulfide | 1 | Methanol | 80 | 9–12 | 1 | <0.5 |
| J........do | 1 | ....do | 120 | 9–12 | 1 | <0.5 |
| K........do | 1 | ....do | 180 | 9–12 | 1 | <0.5 |
| L[2]......do | 1 | ....do | 120 | 9–12 | 1 | <0.5 |
| M........do | 1 | 1,2-dichloroethane | 120 | 9–12 | 1 | <0.5 |

[1] 60 grams of solvent were employed per mole of dialkyl sulfide.
[2] In this run, 10% m. hydrochloric acid, basis dialkyl sulfide, was added to the reaction mixture.

We claim as our invention:

1. The process of preparing dialkyl-methyl sulfonium chlorides having at least one alkyl group of at least four carbon atoms by contacting a higher dialkyl sulfide with methyl chloride in the absence of a solvent at a temperature between about 60° and about 100°C, in the presence of from about 1.5 to 15 molecular equivalents of hydrochloric acid or hydrofluoric acid per mole of higher dialkyl sulfide.

2. The process of claim 1 wherein the higher dialkyl sulfide has an effective chain length of at least nine atoms.

3. The process of claim 2 wherein the alkyl moieties of the higher dialkyl sulfide independently contain from about eight to about 12 carbon atoms per moiety.

4. The process of claim 3 wherein the alkyl moieties are secondary alkyl.

5. The process of claim 1 wherein the molar ratio of methyl chloride to higher dialkyl sulfide is at least 1:1.

6. The process of claim 5 wherein the molar ratio of methyl chloride to higher dialkyl sulfide is maintained within the range of from about 1.5:1 to about 6:1.

* * * * *